(12) United States Patent
Burke et al.

(10) Patent No.: US 7,233,112 B2
(45) Date of Patent: Jun. 19, 2007

(54) PWM SWITCHING POWER SUPPLY CONTROL METHODS

(75) Inventors: Kevin D. Burke, Madison, WI (US); Eric G. Rasmussen, Waunakee, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 57 days.

(21) Appl. No.: 11/138,722

(22) Filed: May 26, 2005

(65) Prior Publication Data

US 2006/0267515 A1    Nov. 30, 2006

(51) Int. Cl.
*H05B 37/02* (2006.01)

(52) U.S. Cl. .................. 315/209 R; 315/247; 315/307; 315/DIG. 4

(58) Field of Classification Search .......... 315/291, 315/307, 360, 246, 247, 209 R, 224–226, 315/DIG. 4, DIG. 7; 363/34, 37, 41
See application file for complete search history.

(56) References Cited

U.S. PATENT DOCUMENTS

| 4,890,210 A * | 12/1989 | Myers ................... 363/21.11 |
| 5,045,774 A | 9/1991 | Bromberg ................ 323/322 |
| 5,045,989 A * | 9/1991 | Higaki et al. ............. 363/37 |
| 5,424,618 A | 6/1995 | Bertenshaw et al. ....... 315/324 |
| 5,500,575 A | 3/1996 | Ionescu ................... 315/307 |
| 5,696,670 A * | 12/1997 | Roederer et al. ....... 363/21.18 |
| 5,714,847 A | 2/1998 | Lindauer et al. .......... 315/307 |
| 5,789,723 A * | 8/1998 | Hirst ...................... 219/501 |
| 6,275,018 B1 * | 8/2001 | Telefus et al. ............ 323/282 |
| 2002/0008501 A1 * | 1/2002 | Telefus et al. ............ 323/282 |
| 2005/0185353 A1 * | 8/2005 | Rasmussen et al. ....... 361/93.9 |

\* cited by examiner

*Primary Examiner*—Thuy Vinh Tran
(74) *Attorney, Agent, or Firm*—Greer, Burns & Crain, Ltd.; Philip M. Kolehmainen

(57) ABSTRACT

The solid state switching section of a high frequency PWM switching power supply may encounter problems in accurately regulating output power when the requested output power is above a threshold level, the threshold level typically being a high level approaching one hundred percent of the power of the sinusoidal AC power source. Below the threshold level, the power supply is operated in a full PWM mode to regulate the output power level. Above the threshold level, the power supply is operated in a full on, continuously conducting mode in a central part of the half cycles of the AC supply. Outside of this central portion, the power supply is operated in the in the PWM mode, using a duty cycle within the capability of the solid state switching section. The output power level is regulated by varying the duration of the central full on portion of the half cycle. A similar control method is used for reducing heat generated by the solid state switching section of the power supply.

15 Claims, 5 Drawing Sheets

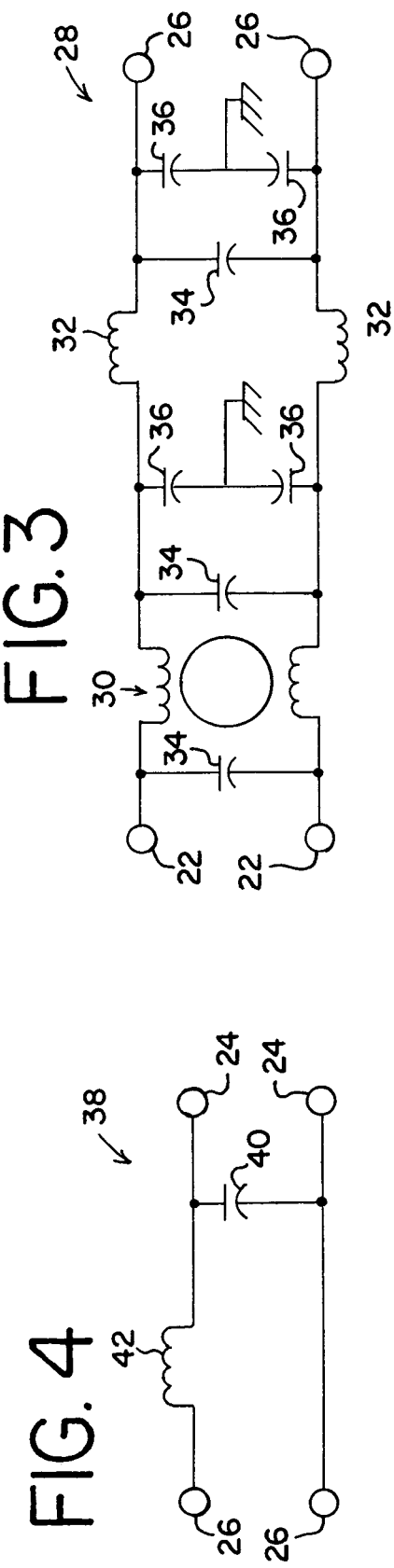
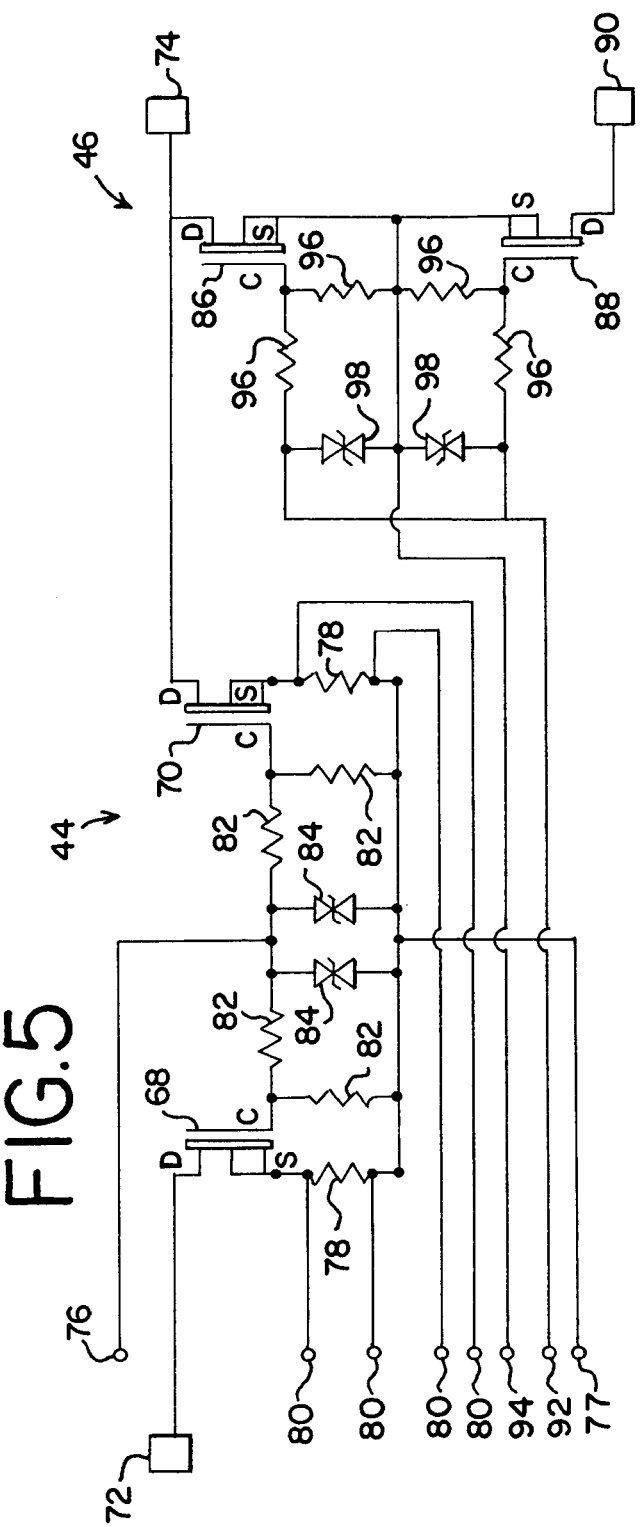

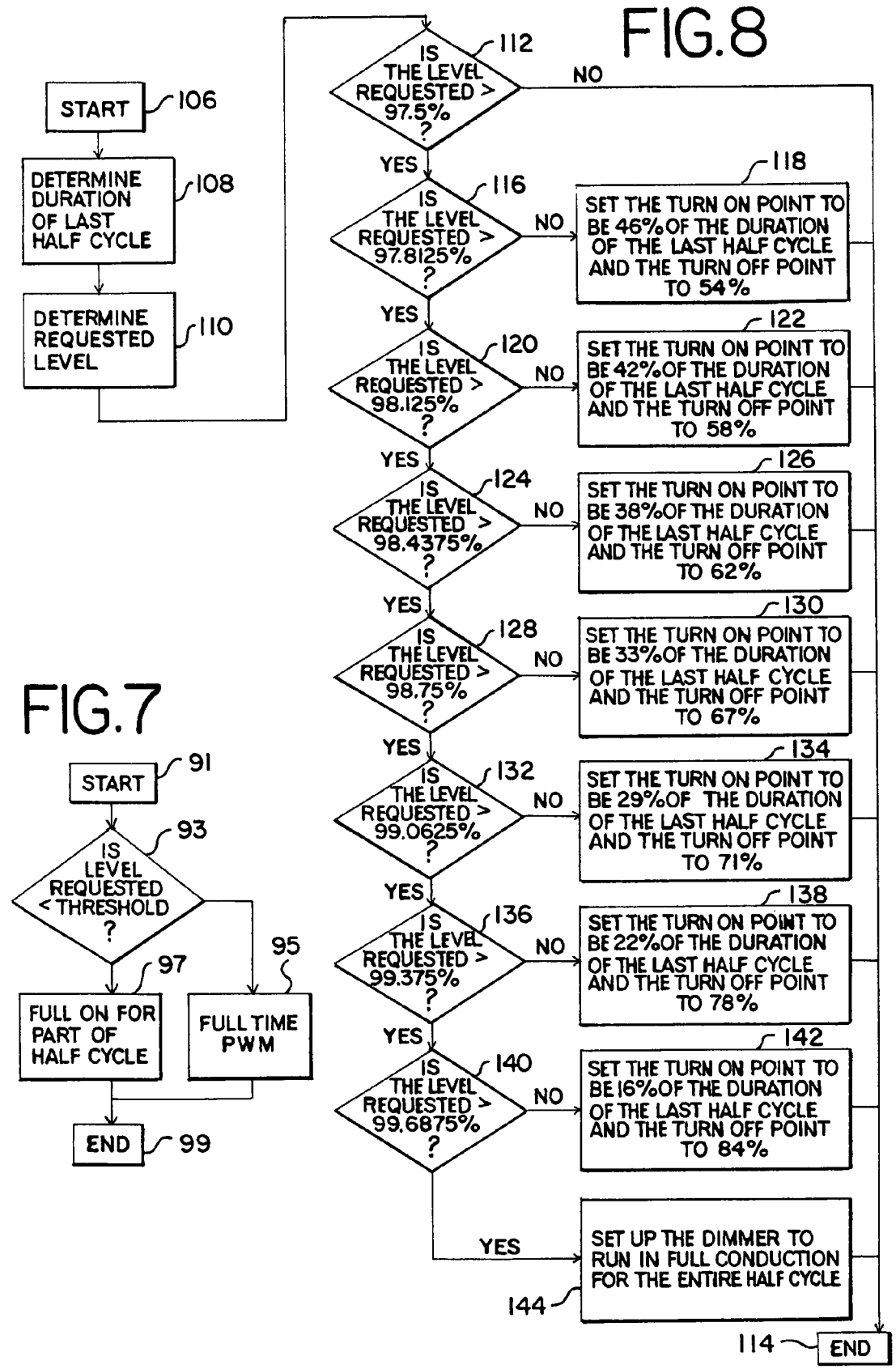

PWM SWITCHING POWER SUPPLY CONTROL METHODS

FIELD OF THE INVENTION

The present invention relates to methods for controlling a pulse width modulation (PWM) switching power supply.

DESCRIPTION OF THE PRIOR ART

Pulse width modulation switching power supplies have various applications including the dimming of lamps. A lamp may be provided with power by a dimmer so that the lamp can be operated at variable, selected light intensity levels. For example, luminaires for theatrical, architectural and other applications are often provided with operating power by dimmers. Phase angle dimmers for this purpose are well known, and typically include solid state switches such as SCRs for interconnecting an AC power source to a lamp load. AC voltage from the source is sinusoidal. A phase control circuit renders a solid state switch conductive at a point during a half cycle of the sinusoid, the point being selected to supply to the lamp a lamp operating pulse having a desired quantity of power in order to produce a desired level of light intensity. Switching operations are performed by the SCRs in a phase angle dimmer at a low frequency, for example once or twice in each power supply cycle of fifty or sixty cycles per second.

With a phase angle dimmer, the abrupt low frequency switching during the half cycles of the power supply and resultant abrupt amplitude changes in the current supplied to a luminaire can cause problems of electrical noise and mechanical filament noise, requiring extensive filtering. In some dimmer applications, even with filtering, the noise incident to phase angle dimming can be unacceptable. In addition, phase angle dimmers have the disadvantage that they can reflect harmonic distortion into the mains power supply.

To avoid the potential problems with low frequency phase angle dimming it has been proposed to use pulse width modulation (PWM) techniques with solid state switches operating at a higher frequency. With this type of power supply, known as a switch mode or PWM power supply, light intensity is varied by changing the pulse width modulation duty cycle. In some instances, the output, after filtering in an output load filter, can have a shape similar to the power supply wave form with attenuated amplitude. Typically both the input power supply and the attenuated output are sine waves. For this reason, pulse width modulation dimmers are also described as sinewave dimmers.

A PWM switching power supply such as a dimmer should be able to continuously vary the output power level between minimum and maximum output power levels. The minimum power level typically is zero, and the maximum typically is generally equal to the power level of the AC sinusoidal power supply. It is important that the output power level be smoothly varied without breaks or discontinuities throughout the full range. As the desired output power level increases, the duration of the switch off portion of the PWM duty cycle decreases. At high PWM frequencies and very high power levels, the capabilities of the solid state switches can be approached or exceeded, and smooth power level transitions are difficult or impossible to achieve.

Solid state switches operating in PWM power supplies generate heat. The amount of heat depends on the frequency of switch operation and upon the magnitude of current being switched. Solid state switching heat generation can be a problem. Excess heat can damage the solid state switches. In some applications, such as architectural dimmers it would be particularly advantageous to reduce switching heat because fans providing active cooling may not be available.

U.S. Pat. Nos. 5,045,774; 5,424,618; 5,500,575; 5, 5,714,847 and 6,346,778 describe sinewave dimmers. U.S. Pat. No. 5,424,618 discloses an asynchronous dimmer using PWM techniques. In some arrangements described in this patent, during a half cycle of the power supply waveform, the solid state switches are operated with pulses for part of the cycle and are operated in full conduction for another part of the cycle. The purpose of this mode of operation is to replicate a phase angle dimmer, but without abrupt transitions, or to limit peak currents.

SUMMARY OF THE INVENTION

A primary object of the present invention is to provide improved methods for controlling pulse width modulation switching power supplies such as sinewave dimmers. Other objects are to provide an improved control method for providing smooth and continuous output power adjustments throughout an entire output power range; to provide an improved control method for reducing heat due to switching in a PWM switching power supply; and to provide PWM switching power supply control methods that overcome difficulties experienced with prior art methods.

In brief, in accordance with the invention there is provided a method of regulating the power output level of a switching PWM power supply to supply a desired power output level in a range from a minimum to a maximum power output level. The method includes applying an AC sinusoidal input signal to a solid state switching section. The solid state switching section is controlled to output a variable portion of the power of the AC sinusoidal input signal. The controlling step includes, in a first segment of the range, driving the solid state switching section throughout a full half cycle of the AC sinusoidal input signal with a pulse width modulation signal. The controlling step further includes, in a second segment of the range, driving the solid state switching section in a first portion of a half cycle of the AC sinusoidal input signal with a pulse width modulation signal, and in a second portion of the half cycle of the AC sinusoidal input signal, placing the solid state switching section continuously in a condition of full conduction

BRIEF DESCRIPTION OF THE DRAWING

The present invention together with the above and other objects and advantages may best be understood from the following detailed description of the preferred embodiment of the invention illustrated in the drawings, wherein:

FIG. 3 is a schematic diagram of the input line filter of the power supply;

FIG. 4 is a schematic diagram of the output load filter of the power supply;

FIG. 5 is a schematic diagram of the power switching stage of the power supply;

FIG. 7 is a simplified flow cart of a routine for controlling a PWM switched power supply in accordance with the present invention;

FIG. 8 is a flow chart of a routine used in producing the output power regulation seen in FIGS. 6A–6G;

DETAILED DESCRIPTION OF THE PREFERRED EMBODIMENT

Figure 1:
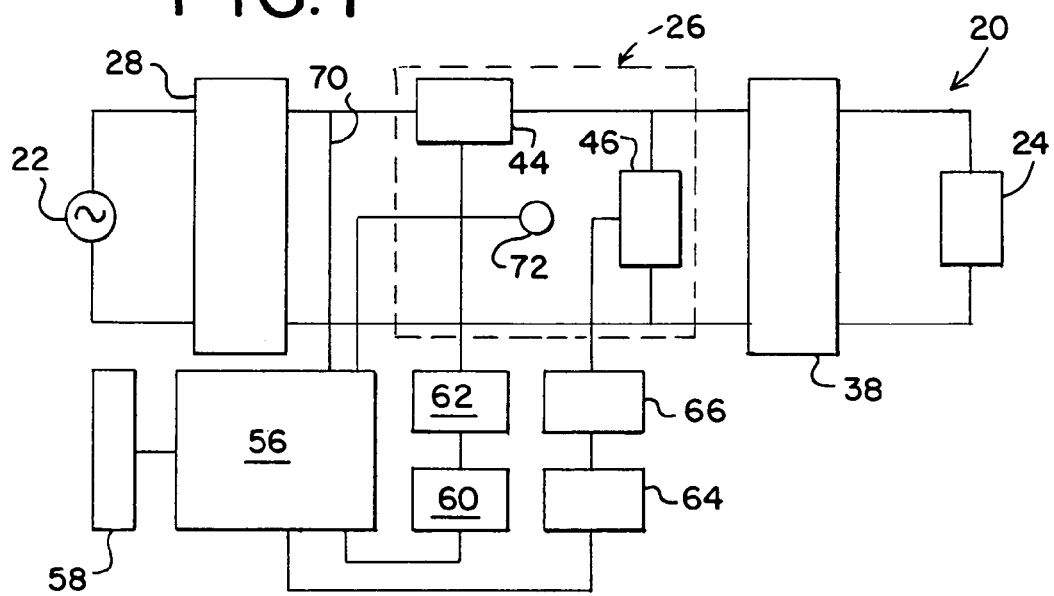
FIG. 1 is a block diagram of a PWM switched power supply with which the methods of the present invention can be performed.

Having reference now to the drawing, FIG. 1 is a simplified block diagram of a PWM switching power supply designated as a whole by the reference character 20, and, in the preferred embodiment of the invention, taking the form of a synchronous sinewave dimmer. The dimmer 20 is connected to a conventional mains power supply 22 providing a sinusoidal alternating current power supply waveform of, for example, sixty hertz and nominal 120 volts AC. The dimmer 20 provides output power to a load 24. In a typical application, the load 24 may be a resistive load such as an incandescent lamp, or a reactive load such as a power supply for a gas discharge lamp or fluorescent lamp. A power switching stage 26 in accordance with the present invention is controlled to use combinations of pulse width modulation (PWM) and continuous full conduction to variably attenuate input power and supply desired output power to the load 24.

An input line filter 28 filters out noise that may be present on the power supply signal and assures the supply of clean AC power to the power switching stage 26. In addition the input line filter 28 filters out switching noise from the power switching stage 26 and prevents the conduction of noise back to the power supply 22. Preferably the input line filter 28, as seen in FIG. 3, is a high order line filter including a common mode inductor 30, differential mode inductors 32, line to neutral differential mode X capacitors 34 and line/neutral to earth ground common mode Y capacitors 36.

An output load filter 38 filters out the PWM switching frequency of the power switching stage 26 and, in some modes of operation, reconstructs the output voltage waveform into a line frequency, variable amplitude sinewave with the same frequency as the power supply sinewave. As seen in FIG. 4, the output load filter typically may include a bypass capacitance represented by capacitor 40. The core of the load filter is an output inductor 42 in series with the load 24 that stores energy and smoothes the output waveform. In order to accommodate a wide range of load values, preferably the inductor 42 is a swinging inductor. For example, the inductor 42 can have a reactance of 10 mH at an output current of 0.25 amp, a reactance of 1 mH at an output current of 10 amps and a reactance of 0.5 mH at an output current of 20 amps.

The power switching stage 26 includes a series switching section 44 connected in series between the power supply 22 and the series connected load 24 and load inductor 42. The power switching stage 26 also includes a clamp switching section 46 shunted across the series connected load 24 and load inductor 42. The series switching section 44 is alternately rendered conductive and nonconductive at a high frequency with a PWM signal having a duty cycle chosen to provide a desired output power level. The clamp switching section 46 is alternately rendered nonconductive and conductive by the inverse of the PWM signal so that the clamp switching section 46 is nonconductive when the series switching section 44 is conductive, and so that the series switching section 44 is nonconductive when the clamp switching section 46 is conductive. The power switching stage 26 preferably operates at a high frequency of at least 20 kilohertz, with about 50 kilohertz being preferred.

Figure 2:
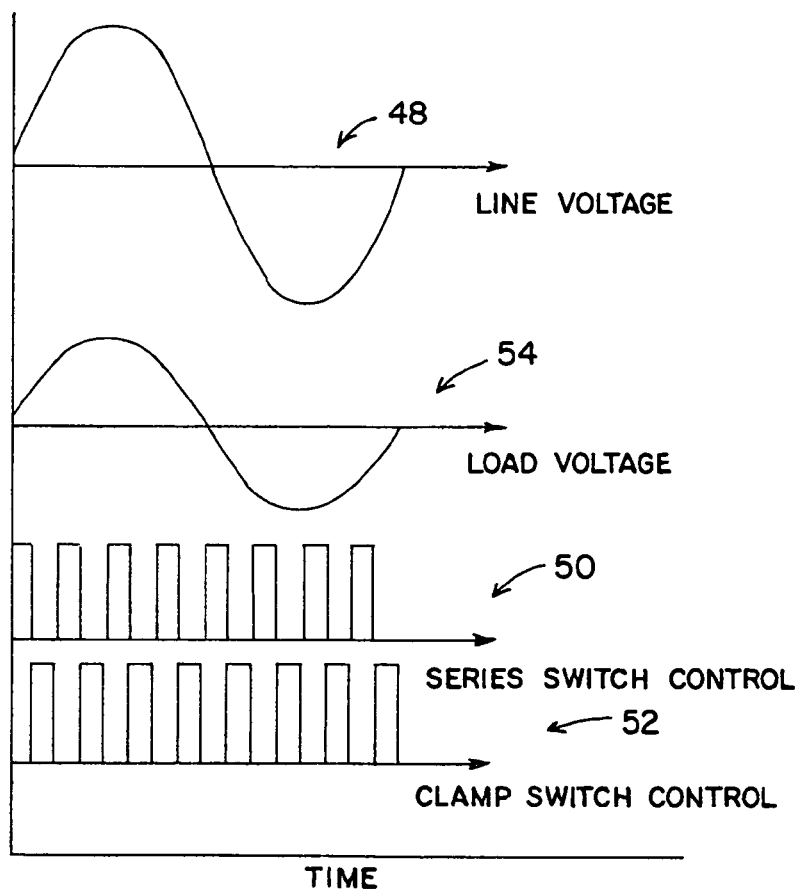
FIG. 2 a graph showing pulse width modulation operation of the power supply.

FIG. 2 graphically illustrates the operation of the power switching stage 26 operating in PWM mode. The operating frequency seen in FIG. 2 is very low and is not representative of an actual high frequency PWM operation, but permits the PWM operation to be shown graphically. Curve 48 shows the input sinusoidal AC waveform, for example sixty hertz and 120 volts AC. Curve 50 shows a control signal for rendering the series switching section 44 alternately conductive and nonconductive with a fifty percent duty cycle. Curve 52 shows the complementary control signal for rendering the clamp switching section 46 alternately nonconductive and nonconductive. Curve 54 shows the output load signal resulting from chopping of the input signal by the series switching section 44, smoothed by the output load filter 38. With the fifty percent duty cycle, the output waveform amplitude is approximately one-half of the power supply waveform amplitude.

For larger desired output power levels, the duty cycle of the PWM signal is increased, providing longer power on segments of curve 50 and shorter power off segments of curve 52. Conversely, for lower desired output power levels, the duty cycle of the PWM signal is decreased, providing shorter power on segments of curve 50 and longer power off segments of curve 52.

As seen in FIG. 1, a microprocessor based programmable controller 56 controls the operation of the series and clamp switching sections 44 and 46 by providing switching control signals such as those seen in FIG. 2. The controller 56 includes or has access to program and data memory and is programmable by instructions loaded into program memory in the form of data received from a data input-output bus or device 58.

The controller 56 under software control supplies operating signals including high frequency PWM series switching control signals to the series switching section 44 through an opto-isolation circuit 60 and a driver circuit 62. Similarly, the controller 56 under software control supplies operating signals including high frequency inverse PWM series switching control signals to the clamp switching section 46 through an opto-isolation circuit 64 and a driver circuit 66.

On line 70 the controller 56 receives a feedback signal indicating the power supply voltage. This signal can be used under software control for power signal zero crossing detection, and for adjusting the PWM and inverse PWM control signals in order to accurately regulate the output load signal. A sensor 72 associated with the power switching stage 26 provides an operating temperature feedback signal that may be used, for example, for excess temperature power decrease or shutoff capability.

The power switching stage 26 is shown in more detail in FIG. 5. The series switching section 44 includes a complementary pair of MOSFETs 68 and 70 functioning as a high speed, high power, bidirectional switch connected in series between a power supply terminal 72 connected to the line input filter 28 and a load output terminal 74 connected to the inductor 42 of the output load filter 38. The MOSFETs 68 and 70 are simultaneously rendered conductive or nonconductive by a high frequency PWM control signal or other signal supplied by the controller 56 and applied through opto-isolator circuit 60 and driver circuit 62 across a gate control input terminal 76 and a ground terminal 77. Current sensing resistors 78 connected between ground and the source terminals of the MOSFETs 68 and 70 provide signals to terminals 80 for use by the controller 56 for overcurrent protection or the like. Resistors 82 serve as bleeder resistors and stabilizing series resistors connected to the gate terminals of the MOSFETs 68 and 70. Bidirectional zeners 84 provide transient protection.

The clamp switching section 46 includes a complementary pair of MOSFETs 86 and 88 functioning as a high speed, high power, bidirectional switch connected in series between the load output terminal 74 and a load neutral terminal 90. The MOSFETs 86 and 88 are simultaneously rendered nonconductive or conductive by a high frequency inverse PWM control signal or other signal supplied by the controller 56 and applied through opto-isolator circuit 64 and driver circuit 66 across a gate control input terminal 92 and a ground terminal 94. Resistors 96 function as bleeder resistors and stabilizing series resistors connected to the gate terminals of the MOSFETs 86 and 88. Bidirectional zeners 98 provide transient protection.

Although other types of high power solid state switching devices, such as IGBTs, might be used for the series and clamp switching sections 44 and 46, MOSFETs are preferred because of their superior high speed and high power switching characteristics. In addition, the bidirectional nature and fast switching speeds of MOSFETs make them preferable for a synchronous dimmer having both series and clamp high speed switching. Principles of the present invention can be applied to asynchronous as well as synchronous power supplies. In this instance, the clamp switching section 46 may include anti-parallel blocking diodes and parallel switching devices operated in synchronism with the power supply waveform.

In the preferred embodiment of the invention, the controller 56 is software controlled to insert dead times between the series and clamp control signals. A dead time interval begins at the end of each series switch PWM "on" control signal and ends at the beginning of each clamp switch inverse PWM "on" control signal. During this dead time interval neither the series switching section 44 nor the clamp switching section 46 is receiving an "on" signal. The dead time interval is selected to be to be long enough that so that switching of the series switching section 44 can be reliably completed and so that a condition of simultaneous conduction of the series switching section 44 and the clamp switching section 46 is avoided. In addition, the dead time interval is selected to be no longer than necessary in order to reliably complete the switching operations. As a result, the clamping switching section 46 is rendered conductive as soon as possible after the series switching section 44 is rendered nonconductive to establish a circuit path for efficient dissipation through the load 24 of energy stored in the output load filter inductor 42. This avoids undesirable voltage spikes that can distort the desired sinewave output waveform and can result in circuit component damage.

Another dead time interval begins at the end of each clamp switch inverse PWM "on" control signal and ends at the beginning of each series switch PWM "on" control signal. This dead time interval is selected to be to be long enough that so that switching of the clamp switching section 46 can be reliably completed and so that a condition of simultaneous conduction of the series switching section 44 and the clamp switching section 46 is avoided. If circuit characteristics or power dissipation requirements permit, it would be possible for the two dead time intervals to have different lengths, however, it is presently preferred that they have the same length. A further description of the dead time intervals, their effect, and the way in which they are provided can be found in pending U.S. patent application Ser. No. 10/971,682 filed on Oct. 21, 2004, and incorporated herein by reference.

At the highest output power levels, difficulties can be encountered using the power switching stage 26 to provide PWM control signals. In one example, PWM techniques can provide accurate and full regulation of output power from low desired power levels up to about 97.5% of full power. Above that level, however, difficulties can arise due to excessive heat resulting from solid state switching. Linear response may also be a problem at high output levels. This is an undesirable condition because it is important to provide smooth regulation of power. In a dimmer, for example, at high power levels there should be no visible jumps or gaps in intensity as the intensity level is varied, and excessive heat should be avoided.

In order to solve such problems and provide smooth and accurate power regulation up to full output power, in accordance with the present invention, in a range of high output power levels the power switching stage is placed in a full conduction condition for a part of each half cycle of the AC power supply waveform. Below a threshold output power level, in the range where PWM control operates properly, PWM control is used throughout the full half cycle. Above that threshold level, PWM control is used for parts of the half cycle, and full conduction is used for varying segments of the half cycle to achieve increments of greater power output levels. To minimize distortion of the sinewave output waveform, the full conduction segment of the half cycle is centered on the peak of the half cycle.

FIG. 7 is a block diagram of a simplified routine for carrying out this aspect of the invention. The routine starts at block 91. At block 93, it is determined whether or not the requested or desired output voltage is below a threshold level. This threshold level is the highest output voltage at which the solid state switching devices of the PWM switching power supply can operate fast enough to reliably and consistently maintain the desired PWM regulation.

If the requested output power level is below the threshold value, then at block 95 the solid state switches are operated full time in normal PWM mode. If the requested output power level is at or above the threshold, then at block 97 the mode of operation is changed and the solid state switches are operated in a full on condition for part of each half cycle of the AC power supply. In this mode of operation, for the remainder of the half cycle, PWM operation at the threshold level is continued. The routine ends at block 99.

FIGS. 6A–6G illustrate an example of this method of the present invention. When the requested output power is at the threshold value of 97.5% of full, 100% power, PWM operation of the power switching stage is used. The PWM duty cycle at this 97.5% level includes a relatively large "on" portion and a relatively short "off" portion.

Figure 6A:
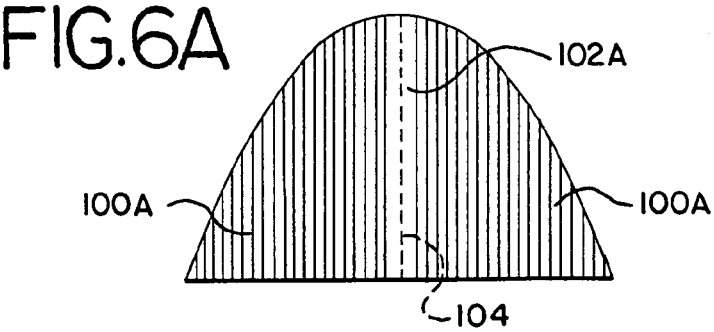
FIGS. 6A through 6G show half cycles of the AC power supply waveform with output power levels regulated in accordance with the present invention.
Figure 6B:
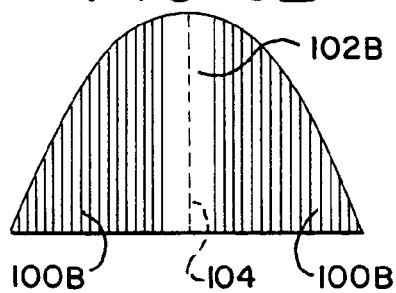
Figure 6C:
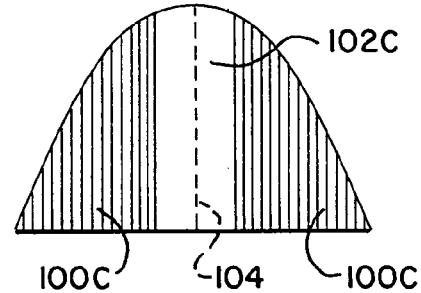
Figure 6D:
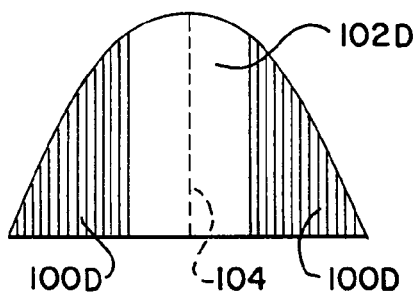
Figure 6E:
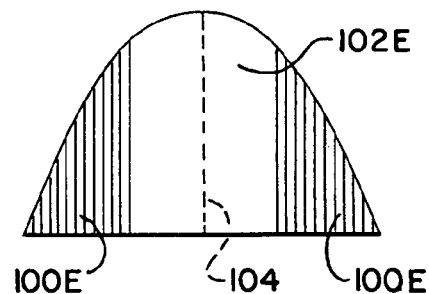
Figure 6F:
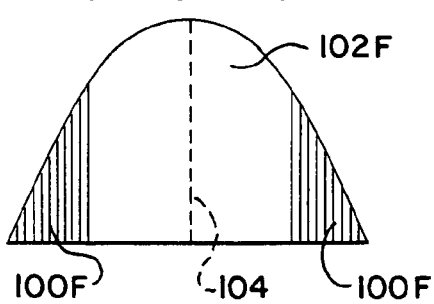
Figure 6G:
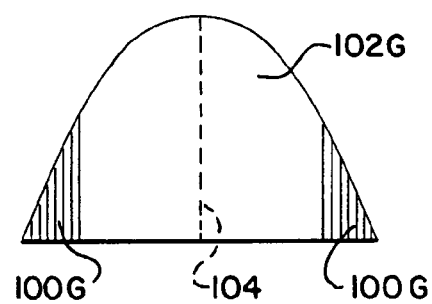

FIG. 6A illustrates the control, during a half cycle AC power supply, of the switching section 26 when the desired output power level is above the threshold value of 97.5%, and is within the range of 97.5% to 97.8125% In this range, the 97.5% PWM duty cycle is used in portions 100A of the half cycle. In the portion 102A, the controller 56 operates the switching stage 26 in a full conduction mode, with the solid state switches 68 and 70 of the series switching section 44 conductive and the solid state switches 86 and 88 of the clamping switching stage nonconductive. As a result, in this interval 102A, effectively the entire AC input power is coupled to the output load filter 38 and load 24. The difference between the 97.5% PWM duty cycle and full on operation are small enough that total harmonic distortion is less than one percent and noise is not significantly increased. Heat generated by operation of the solid state switches is highest near the peak 104 of the half cycle. To avoid the heat caused by switching that would result from PWM operation at the peak 104, the full on portion 102 includes, and preferably is symmetrical about, the peak 104.

As appears from FIGS. 6A–6G, and from the table below, the duration of the PWM operation segments 100, during which the 97.5% PWM duty cycle is used, are decreased in increments at increasing output power levels. Conversely, the duration of the full on segments 102 are increased in increments at increasing output power levels. In this illustrative example, there are seven step increases in output power between the 97.5% output power level, when the 97.5%PWM duty cycle is used for the entire half cycle, and the full 100% power level when the power switching stage is fully conductive for the entire half cycle. These steps are seen in FIGS. 6A–6G. The number of intermediate steps could be fewer or greater, or an essentially continuous variation could be used. The number of increments is selected in the illustrative example in order that the steps or gradations of light intensity in a dimmer application are not visible to an observer in a worst case situation when the load 24 is a low wattage incandescent bulb.

To minimize discontinuities, it is preferred that the changes in output power between the incremental steps are equal. With seven steps, the full on segment for each step is incremented by 12.5% between zero at the 97.5% power level and 100% at the full on power level. The control operations performed by the controller 56 are based in the time domain, and therefore the power domain is converted from the power domain to the time domain for each increment. Using the FIG. 6A increment as an example, the full power segment 102A should be centered around the peak 104 and should include 12.5% of the total power in the entire half cycle.

As an example of calculation of the time domain for the step of FIG. 6A, to include 12.5%, the full power segment 102A should begin when 43.75% of the power in the half cycle has elapsed, and should end at the point of symmetry when 56.25% of the power in the half cycle has elapsed. The segment 102A therefore begins when the integral of the sinewave half cycle is 43.75% of the integral of a full half cycle. The integral of the full half cycle is two, and 43.75% of two is 0.875. The integral of sin(x) is −cos(x)+1, so 0.875=−cos(x)+1, or cos(x)=0.125. Therefore, x=1.45 in radians. 1.45 divided by pi is 0.46. The period 102A of full on solid state switch operation therefore begins at 46% of the half cycle time duration, and for symmetry around the peak 104, ends at 54% of the half cycle time duration.

As seen in FIGS. 6A–6G, the full on time period increases, and the 97.5% duty cycle PWM operation period decreases, in each step of higher desired output level. Calculations for each of these steps result in the time domain values set forth in the following table. The first column, where applicable, identifies the drawing figure illustrating the step. The second column gives the range of desired output levels, in percentages of AC input power, in which the step is used. The third column is the power domain value of the full on period 102 of the step, or the percentage of total half cycle power for which the solid state series switches are operated full on in a continuously conducting state. The final two columns are the times, expressed as percentages of the total half cycle time, for turning on, and for turning off, the full on period 102 of the step.

TABLE 1

| FIG. | Output Range | Power Domain % of ½ cycle at full power | Time Domain | |
|---|---|---|---|---|
| | | | Start, % of ½ cycle period | Stop, % of ½ cycle period |
| 6A | 97.5–97.8125% | 12.5 | 46 | 54 |
| 6B | 97.8125–98.125% | 25 | 42 | 58 |
| 6C | 98.125–98.4375% | 37.5 | 38 | 62 |
| 6D | 98.4375–98.75% | 50 | 33 | 67 |
| 6E | 98.75–99.0265% | 62.5 | 29 | 71 |
| 6F | 99.0265–99.375% | 75 | 22 | 78 |
| 6G | 99.375–99.6875% | 87.5 | 16 | 84 |
| | 99.6875–100% | 100 | Continuous on | |

FIG. 8 is a flow chart of a routine carried out under software control by the controller 56 in order to operate the power switching stage 26 to obtain the steps illustrated in FIGS. 6A–6G and described in the above table. In most of the range of requested output power levels, the controller 56 provides PWM control signals for operating the series and clamp switching sections 44 and 46 of the power switching stage 46 in normal PWM operation. The routine of FIG. 8 preempts and modifies this normal PWM operation when the requested power level is at a high value where problems can arise if the power switching section 46 is used to provide normal PWM operation.

The FIG. 8 routine starts at block 106 and runs at the beginning of every half cycle of the AC power supply waveform. At block 108, a half cycle time duration is determined, based on the conclusion that the duration of the present half cycle is equal to the duration of the previous half cycle. In block 110, the requested output level is determined. In the preferred arrangement, the controller 56 receives from the bus or device 58 a user selected desired power output level, and this is compared with the AC source power level. The result is expressed as a percentage of full power, full power being essentially equal to 100% of the input.

In decision block 112, it is determined whether or not the requested output power level is greater than the threshold value of 97.5%. If it is not, the routine ends at end block 114 and the normal full half cycle PWM operation of the power switching stage 46 proceeds. If the requested power output level is greater than the 97.5% threshold, then the routine proceeds to decision block 116.

In decision block 116, a determination is made whether or not the requested power level is in the step or increment seen in FIG. 6A and described in row 1 of the above table. If it is, then at block 118 the turn on point for the full on period 102A of the present half cycle is set to 46% of the half cycle duration and the turn off point for the full on period 102A of the present half cycle is set to 46%. These are the time domain values seen in columns 4 and 5 of the above table. When these times are set, the routine ends at block 114. If the block 116 determination is negative, the routine proceeds to block 120.

The subroutine of blocks 116–118 is repeated at increasing power input step levels at blocks 120–122; 124–126, 128, 130, 132–134, 136–138 and 140–142. Each of these subroutines corresponds to one of FIGS. 6B–6G and to one of rows 2–7 of the above table. In each subroutine, the turn on and turn off times are set if the power output voltage step criteria is satisfied. At each subroutine, if the criteria is satisfied, the FIG. 8 routine ends at block 114, and if not the next subroutine proceeds.

If none of the subroutines 116–118, 120–122; 124–126, 128,130, 132–134, 136–138 and 140–142 results in the setting of on and off times for the full on segment of the half cycle, then at block 144, the power switching stage 46 is operated continuously throughout the half cycle in a full on, continuously conducting state for a full, 100% output power level. n This is illustrated in row 8 of the above table.

Figure 9:
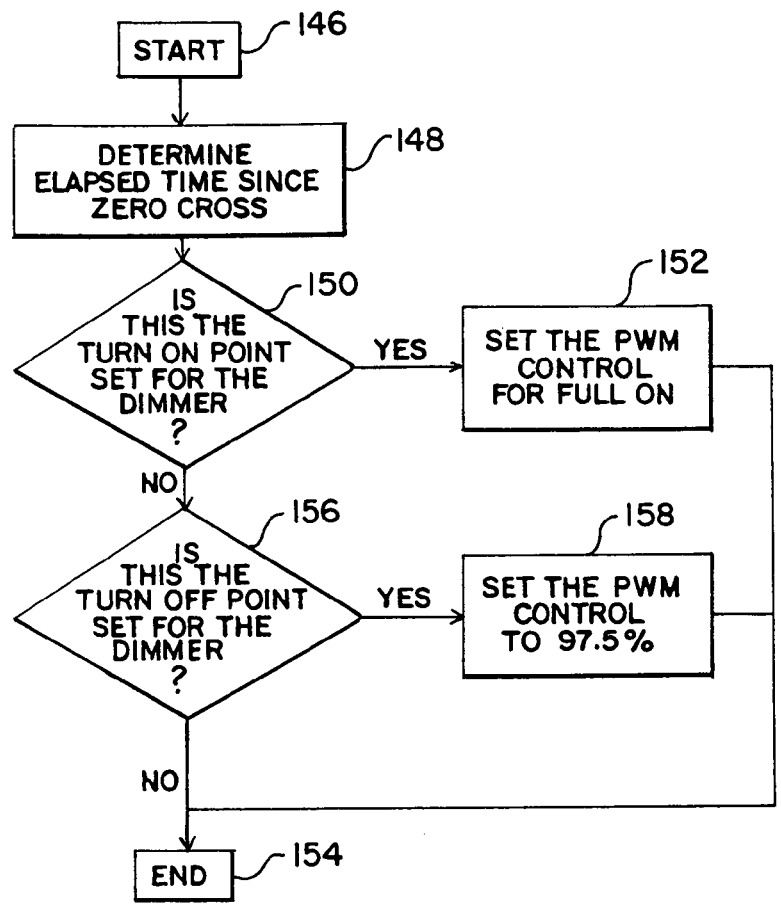
FIG. 9 is a flow chart of a routine used in conjunction with the routine of FIG. 8 for producing the output power regulation seen in FIGS. 6A–6G.

FIG. 9 is a block diagram of a routine for implementing the full on start and stop times determined in the routine of FIG. 8. The FIG. 9 routine starts at block 146 and runs every 27.5 microseconds, hundreds of times during each half cycle of the AC power supply. In block 148 the elapsed time in the present half cycle is counted. In decision block 150, the elapsed time count is compared with the full on period start time set in the routine of FIG. 8. If a start time is reached, then at block 152, the PWM operation of the power switching stage 46 is overridden and the power switching stage 46 is operated in the full on mode with the series switching section 44 conductive and the clamp switching section 46 nonconductive. Then the routine ends at block 154.

At block 150, if the elapsed half cycle time count is not the start time, the routine continues at decision block 156 where the time count is compared to the full on period stop time set in the routine of FIG. 8. If a stop time is reached, then at block 158, the full on mode operation of the power switching stage 46 is discontinued, and the PWM operation of the power switching stage 46 resumes. Then the routine ends at block 154.

When the requested output power level is below the threshold of 97.5%, the routine of FIG. 8 does not set start and stop times for a full on period of operation. In this case, neither decision block 150 or 156 of the routine of FIG. 9 is satisfied and the routine ends at block 154 without preempting the normal full time PWM operation of the power switching stage 26.

Heat resulting from high frequency PWM switching operation of the solid state switches of the power switching stage 46 can cause difficulties in some applications. For example, in dimmers for architectural lighting applications, it is preferable to rely on convection cooling rather than active cooling using a fan or the like. The present invention provides a method for reducing switching heat generation in a PWM switching power supply such as a dimmer.

Figure 10:
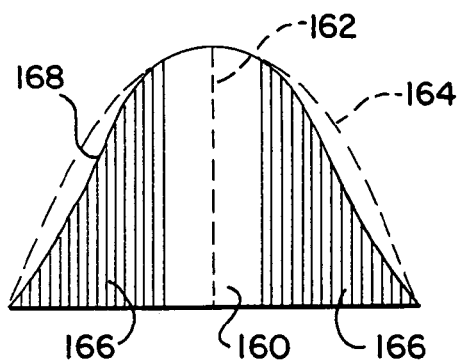
FIG. 10 shows a half cycle of the AC power supply waveform with the power supply operated in order to reduce heat resulting from switching of the power supply.
Figure 11:
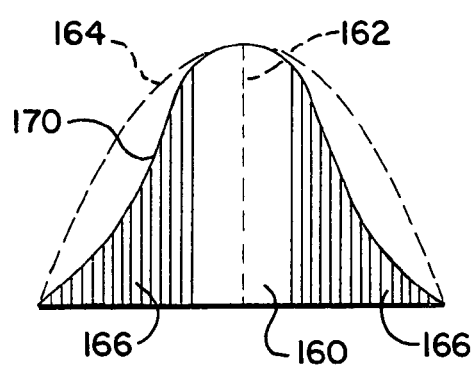
FIG. 11 is a view like FIG. 10 showing a reduced output power level.

FIGS. 10 and 11 each illustrate a half cycle of the AC power supply with the power supply 20 operated in accordance with this aspect of the invention. In both FIGS. 10 and 11, the power switching stage is operated during a portion 160 of the half cycle in a full on, continuously conducting state. In this full on state, no switching occurs in the solid state switches, and no switching heat is generated. The heat resulting from switches is the greatest around the peak 162 of the half cycle. In order to maximized the desired reduction in switching heat, the full on portion 160 is located at and centered on the peak 162.

The full sinewave shape is indicated by line 164 in FIGS. 10 and 11. To regulate the output power level, PWM operation is used in the portions 166 of the half cycle flanking the full on portion 160. In FIG. 10, the PWM duty cycle is set to reduce the power level from a full on sinewave to the reduced level indicated by curve 168. In FIG. 11, the PWM duty cycle is changed to further reduce the output power level to the level indicated by line 170.

While the present invention has been described with reference to the details of the embodiment of the invention shown in the drawing, these details are not intended to limit the scope of the invention as claimed in the appended claims.

What is claimed is:

1. A method of regulating a switching PWM power supply having a duty cycle in order to supply a power output signal having a desired power output level in a range from a minimum to a maximum power output level, said method comprising:

applying an AC sinusoidal input signal to a solid state switching section, the AC sinusoidal input signal having alternating positive and negative half cycles separated by zero crossings and each having a peak;

controlling the solid state switching section to include in the output signal a variable portion of the power of the AC sinusoidal input signal;

said controlling step including, in a first segment of the range, driving the solid state switching section throughout the full half cycle of the AC sinusoidal input signal with a pulse width modulation signal; and said controlling step further including, in a second segment of the range, driving the solid state switching section in a first portion of the half cycle of the AC sinusoidal input signal with a pulse width modulation signal, and in a second portion of the half cycle of the AC sinusoidal input signal, placing the solid state switching section continuously in a condition of full conduction.

2. A method as claimed in claim 1 further comprising filtering the variable portion outputted from the solid state switching section to smooth the power output signal.

3. A method as claimed in claim 1 wherein the first segment of the range is adjacent the minimum power output level and the second portion of the range is adjacent the maximum power output level.

4. A method as claimed in claim 3 wherein the first portion of the half cycle of the AC sinusoidal input signal is adjacent the zero crossing and the second portion includes the peak.

5. A method as claimed in claim 4 wherein, in the first segment of the range, the duty cycle of the pulse width modulation signal corresponds to the desired power output level.

6. A method as claimed in claim 5 wherein, in the second portion of the range, the duty cycle of the pulse width modulation signal is less than the duty cycle of a pulse width modulation signal corresponding to the desired power output level.

7. A method as claimed in claim 6 wherein, in the first segment of the range, the duty cycle of the pulse width modulation is varied in order to supply the desired power output level, and, in the second portion of the range, the duty cycle of the pulse width modulation signal is constant and the duration of the second portion of the half cycle is varied to supply the desired power output level.

8. A method as claimed in claim 6 further comprising establishing a boundary of the first segment at a pulse width modulation duty cycle approaching the limit of the switching capability of the solid state switching section.

9. A method as claimed in claim 6 wherein, during the first parts of the half cycles, the duty cycle of the pulse width modulation signal is varied to regulate the power output level.

10. A method as claimed in claim 1 wherein the minimum power output level is zero and the maximum power output level is effectively equal to the power of the AC input signal.

11. A method as claimed in claim 1 wherein, in the second segment of the range, during the first portion of the half cycle, the duty cycle of the pulse width modulation signal is varied to regulate the power output level.

12. A method for providing a desired output power level with a PWM solid state switching power supply in a range of desired output levels where the solid state switching stage of the power supply does not provide the desired output power level using pulse width modulation, said method comprising:
   operating the solid state switching stage with pulse width modulation in first parts of AC power supply half cycles;
   placing the solid state switching stage in continuous full conduction in second parts of the AC power supply half cycles;
   said first and second parts having durations; and
   varying the duration of the second parts relative to the duration of the first parts of the half cycles in order to regulate the power output levels.

13. A method as claimed in claim 12, wherein the duration of the second parts is increased in order to increase the power output levels.

14. A method as claimed in claim 13 wherein the duration of the second parts is increased in stepped increments.

15. A method as claimed in claim 12 wherein the second parts of the AC power supply half cycles are centered on peaks of the AC power supply half cycles.

* * * * *